US008391468B2

(12) United States Patent
Zhao et al.

(10) Patent No.: US 8,391,468 B2
(45) Date of Patent: Mar. 5, 2013

(54) MULTIFUNCTIONAL KEYBOARD FOR A MOBILE COMMUNICATION DEVICE AND METHOD OF OPERATING THE SAME

(75) Inventors: Wen Zhao, Kanata (CA); Runbo Fu, Kanata (CA); Xin Jin, Nepean (CA); Pokin Yeung, Burnaby (CA); Karen A. Rudnitski, Ottawa (CA)

(73) Assignee: Research In Motion Ltd, Waterloo, Ontario (CA)

( * ) Notice: Subject to any disclaimer, the term of this patent is extended or adjusted under 35 U.S.C. 154(b) by 666 days.

(21) Appl. No.: 12/607,468

(22) Filed: Oct. 28, 2009

(65) Prior Publication Data

US 2010/0048261 A1    Feb. 25, 2010

Related U.S. Application Data

(63) Continuation of application No. 10/004,001, filed on Nov. 1, 2001, now Pat. No. 7,634,080.

(60) Provisional application No. 60/246,321, filed on Nov. 7, 2000.

(51) Int. Cl.
*H04M 1/00* (2006.01)
*H04M 3/00* (2006.01)

(52) U.S. Cl. ............... 379/368; 379/52; 379/356.01; 379/374.02; 400/485; 400/486; 400/489; 345/168; 345/169

(58) Field of Classification Search ........... 379/52, 379/356.01, 368, 374.02, 433.07; 400/485, 400/486, 489; 345/168, 169
See application file for complete search history.

(56) References Cited

U.S. PATENT DOCUMENTS

| | | |
|---|---|---|
| 4,430,639 A | 2/1984 | Bennett et al. |
| 4,503,288 A | 3/1985 | Kessler |
| D278,341 S | 4/1985 | Scheid |
| 4,613,247 A | 9/1986 | McGunnigle |
| D293,241 S | 12/1987 | Wan et al. |
| 4,799,254 A | 1/1989 | Dayton et al. |
| 4,888,815 A | 12/1989 | Ahlemeyer et al. |
| 4,999,795 A | 3/1991 | Lapeyre |
| 5,184,830 A | 2/1993 | Okada et al. |
| 5,217,295 A | 6/1993 | Tortola et al. |
| 5,334,976 A | 8/1994 | Wang |
| 5,336,002 A | 8/1994 | Russo |
| 5,367,298 A | 11/1994 | Axhelm |
| 5,375,165 A | 12/1994 | Haber et al. |
| D357,253 S | 4/1995 | Wong |
| 5,410,141 A | 4/1995 | Koenck et al. |
| 5,426,449 A | 6/1995 | Danziger |
| 5,436,954 A | 7/1995 | Nishiyama et al. |

(Continued)

FOREIGN PATENT DOCUMENTS

| | | |
|---|---|---|
| EP | 0760291 | 3/1997 |
| EP | 0760291 A2 | 3/1997 |

(Continued)

OTHER PUBLICATIONS

Nokia: User's Manual, 9357109 Issue 2 EN, Jun. 7, 1998 (126 pages).

*Primary Examiner* — Tuan Pham (57) ABSTRACT

An apparatus and method for telephony tone signal and character code generation for QWERTY keyboards includes a QWERTY style keyboard, a processor and a keyboard mode control software module. The QWERTY style keyboard has a plurality of letter keys, wherein each letter key is configured to generate a unique input signal. The processor is coupled to the keyboard and is configured to convert each unique input signal generated by the letter keys into a character code and/or a telephony tone signal. The keyboard mode control software module operates on the processor, and controls whether the processor converts the unique input signals from the letter keys into character codes or telephony tone signals.

13 Claims, 7 Drawing Sheets

U.S. PATENT DOCUMENTS

| | | | |
|---|---|---|---|
| 5,457,454 A | 10/1995 | Sugano | |
| 5,500,643 A | 3/1996 | Grant | |
| 5,581,593 A | 12/1996 | Engelke et al. | |
| 5,606,712 A | 2/1997 | Hidaka | |
| 5,611,031 A | 3/1997 | Hertzfeld et al. | |
| 5,660,488 A | 8/1997 | Miller | |
| D383,756 S | 9/1997 | Henderson et al. | |
| 5,672,108 A | 9/1997 | Lam et al. | |
| D386,497 S | 11/1997 | Huslig et al. | |
| 5,737,394 A | 4/1998 | Anderson et al. | |
| D397,369 S | 8/1998 | Rissman | |
| D397,728 S | 9/1998 | Yuen et al. | |
| D399,537 S | 10/1998 | Chi et al. | |
| 5,818,437 A | 10/1998 | Grover et al. | |
| 5,825,353 A | 10/1998 | Will | |
| 5,841,374 A | 11/1998 | Abraham | |
| D403,362 S | 12/1998 | Fai | |
| 5,848,356 A * | 12/1998 | Jambhekar et al. | 455/403 |
| 5,893,798 A | 4/1999 | Stambolic et al. | |
| 5,920,308 A | 7/1999 | Kim | |
| 5,931,873 A | 8/1999 | Cisar | |
| 5,952,942 A | 9/1999 | Balakrishnan et al. | |
| 5,963,197 A | 10/1999 | Bacon et al. | |
| 5,974,238 A | 10/1999 | Chase, Jr. | |
| 5,982,520 A | 11/1999 | Weiser et al. | |
| 5,995,026 A | 11/1999 | Sellers | |
| 6,006,351 A | 12/1999 | Peretz et al. | |
| 6,014,429 A | 1/2000 | LaPorta et al. | |
| 6,023,779 A | 2/2000 | Fullam et al. | |
| 6,046,732 A | 4/2000 | Nishimoto | |
| 6,047,047 A | 4/2000 | Aldridge et al. | |
| 6,047,196 A | 4/2000 | Makela et al. | |
| 6,049,697 A * | 4/2000 | Scozzarella et al. | 340/7.31 |
| 6,052,070 A | 4/2000 | Kivela et al. | |
| 6,081,584 A | 6/2000 | Hidaka | |
| 6,094,197 A | 7/2000 | Buxton et al. | |
| 6,102,594 A | 8/2000 | Strom | |
| 6,107,994 A | 8/2000 | Harada et al. | |
| 6,107,997 A | 8/2000 | Ure | |
| 6,148,261 A | 11/2000 | Obradovich et al. | |
| 6,157,323 A | 12/2000 | Tso et al. | |
| 6,212,412 B1 | 4/2001 | Rogers et al. | |
| 6,218,966 B1 | 4/2001 | Goodwin et al. | |
| 6,241,406 B1 | 6/2001 | Yan | |
| 6,243,789 B1 | 6/2001 | Hasbun et al. | |
| 6,297,795 B1 | 10/2001 | Kato et al. | |
| 6,429,855 B2 | 8/2002 | Pabon et al. | |
| 6,662,020 B1 | 12/2003 | Aaro et al. | |
| 6,690,417 B1 | 2/2004 | Yoshida et al. | |
| 6,965,372 B1 | 11/2005 | Woods | |

FOREIGN PATENT DOCUMENTS

| | | |
|---|---|---|
| EP | 0898222 | 2/1999 |
| EP | 0898222 A1 | 2/1999 |
| WO | 99/37025 A1 | 7/1999 |
| WO | WO9937025 | 7/1999 |
| WO | 00/30381 A1 | 5/2000 |
| WO | WO0030381 | 5/2000 |

* cited by examiner

MULTIFUNCTIONAL KEYBOARD FOR A MOBILE COMMUNICATION DEVICE AND METHOD OF OPERATING THE SAME

CROSS-REFERENCE TO RELATED APPLICATION

This application is a continuation of the application titled, "Multifunctional Keyboard For A Mobile Communication Device And Method Of Operating The Same," application Ser. No. 10/004,001, filed Nov. 1, 2001, which is related to the following prior application: "Apparatus And Method For Telephony Tone Signals and Character Codes Generation For QWERTY Keyboards Or The Like," U.S. Provisional Application No. 60/246,321, filed Nov. 7, 2000. This prior application, including the entire written description and drawing figures, is hereby incorporated into the present application by reference.

BACKGROUND

1. Field of the Invention

This invention relates generally to the field of keyboard user interfaces. In particular, the invention provides a multifunctional keyboard for a mobile communication device and method of operating the same.

2. Description of the Related Art

Advances in communication technology have created a convergence between the fields of data and telephony communications. Traditional communication devices, however, typically include two separate interfaces; one for telephony communication, and one for data communication. Other known communication devices utilize the limited character mapping available on a typical telephone keypad to perform data entry functions. For instance, current telephone keypads map keys to characters on a one-to-many basis: 12 keys (1, 2, 3, 4, 5, 6, 7, 8, 9, *, 0, #) correspond to 26 characters (ABC, DEF, GHI, JKL, MNO, PQRS, TUV, WXYZ). In addition, most such telephone keypads do not include many of the characters from the American Standard Code for Information Interchange (ASCII) character code. In other known communication devices, including many cellular phones, data may be entered with a typical telephone keypad by repeatedly pressing a key to cycle through a number of associated character codes. For instance, repeatedly pressing the keypad key "2" on a typical cellular phone may cycle through the characters A, B, C, a, b, c, and 2.

SUMMARY

A multifunctional keyboard for a mobile communication device includes a keyboard, a processor and a keyboard mode control software module. The keyboard has a plurality of letter keys, wherein each letter key is configured to generate a keyboard output signal. The processor is coupled to the keyboard and is configured to convert each keyboard output signal generated by the letter keys into a character code and/or a telephony tone signal. The keyboard mode control software module operates on the processor, and controls whether the processor converts the keyboard output signals from the letter keys into character codes or telephony tone signals.

BRIEF DESCRIPTION OF THE DRAWINGS

FIG. 5b is a side view of the additional mobile communication device shown in FIG. 5a;

DETAILED DESCRIPTION

Figure 1:
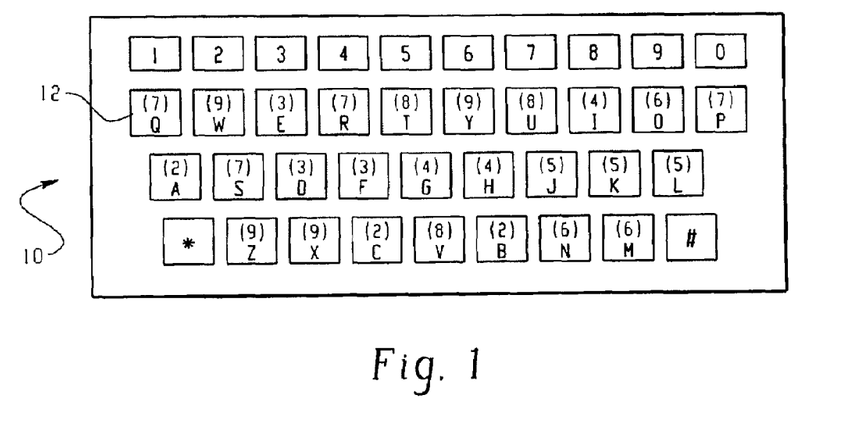
FIG. 1 is an exemplary multifunctional keyboard having keys that are mapped to both telephony tone signals and character code signals.

Referring now to the drawing figures, FIG. 1 is an exemplary multifunctional keyboard 10 having keys 12 that are mapped to both telephony tone signals and character code signals. The multifunctional keyboard 10 is preferably a QWERTY style keyboard in which each of the letter keys 12 also corresponds to a number, although a different keyboard style could be used such as a Dvorak or AZERTY keyboard. The number corresponding to a letter key 12 on the multifunctional keyboard 10 is preferably based on the number/character correspondence on a traditional telephone keypad. For instance, the number two (2) on a traditional telephone keypad corresponds to all of the letters A, B and C. Similarly, the letter keys A, B and C on the multifunctional keyboard 10 each correspond to the number two (2).

The multifunctional keyboard 10 is multifunctional in the sense that it operates in at least two modes: a telephony mode and a data mode. In the telephony mode, a key 12 pressed on the multifunctional keyboard results in a telephony tone signal for communicating with a voice communication network. The telephony tone signal may, for example, be a Dual Tone Multi Frequency (DTMF) signal commonly used for dialing a phone number in voice communication networks. In the data mode, pressing the same key 12 on the multifunctional keyboard 10 will result in the generation of a character code, such as an American Standard Code for Information Interchange (ASCII) character code.

In a preferred embodiment, the multifunctional keyboard 10 may also operate in a joint mode. In the joint mode of operation, depressing keys on the multifunctional keyboard 10 results in the simultaneous generation of both telephony tone signals and character codes. For example, pushing the Q key may result in both an ASCII code for the letter Q and a DTMF signal representing the number seven (7).

Figure 2:
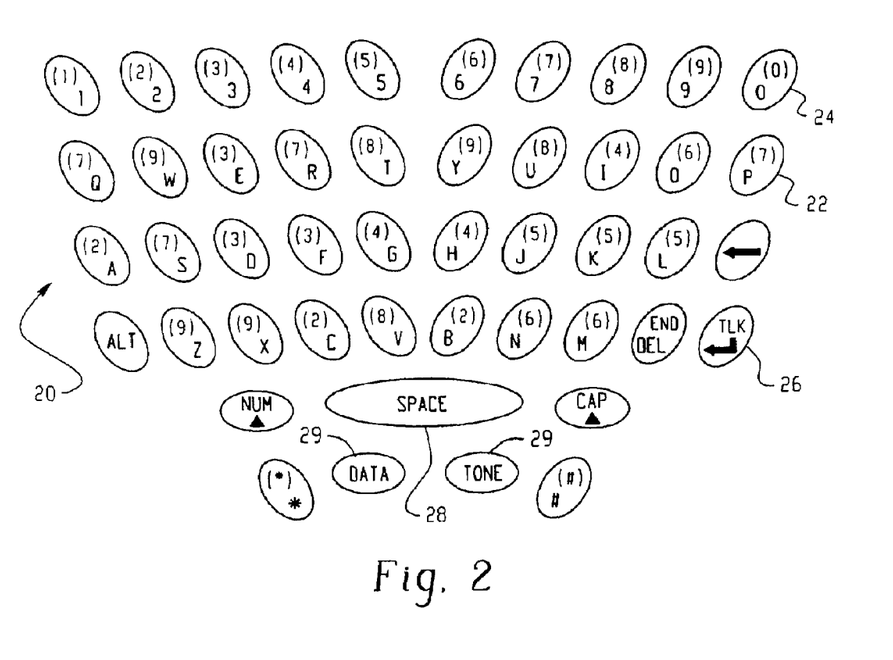
FIG. 2 is another exemplary multifunctional keyboard in which the keys are arranged for optimal use with a hand-held device.

FIG. 2 is another exemplary multifunctional keyboard 20 in which the keys are arranged for optimal use with a hand-held mobile communication device. The keys of the multifunctional keyboard 20 preferably comprise a QWERTY style keyboard, although other keyboard styles could be utilized, having a plurality of letter keys 22, a plurality of number keys 24, specialized keys 26 and a space bar 28. Each of the letter 22 and number 24 keys preferably correspond to a character code while the keyboard 20 is in data (or joint)

mode, and correspond to a telephony tone signal while the keyboard 20 is in telephony (or joint) mode. In addition, one or more of the specialized keys 26 may have functions that vary depending upon the mode of the multifunctional keyboard 20. For instance, one specialized key 26 may perform a "line feed" function while the keyboard 20 is in data mode, and a "talk" function while the keyboard 20 is in telephony mode. In addition, the multifunctional keyboard 20 may include one or more mode keys 29 that switch the keyboard 20 from one operational mode (telephony, data or joint) to another.

Figure 3A:
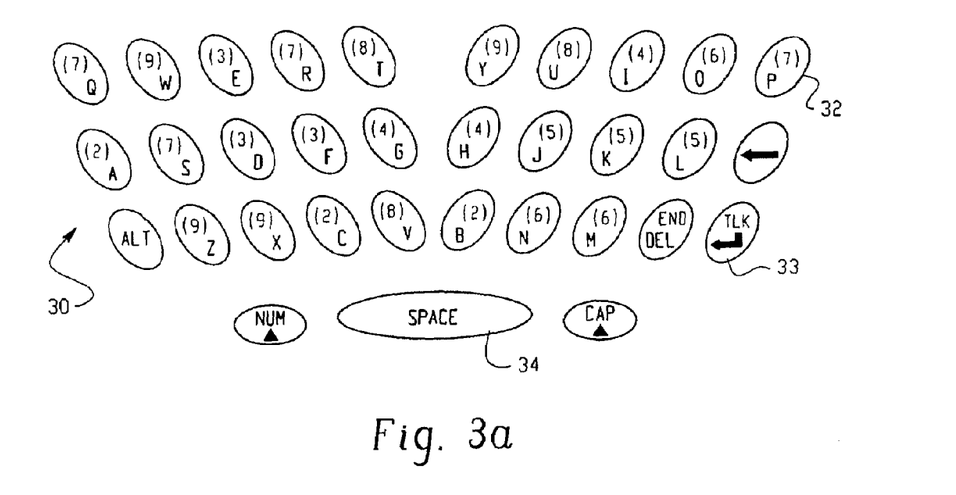
FIGS. 3a and 3b illustrate an additional exemplary multifunctional keyboard for a communication device in which a plurality of character entry keys can function as either letter entry keys or number entry keys.
Figure 3B:
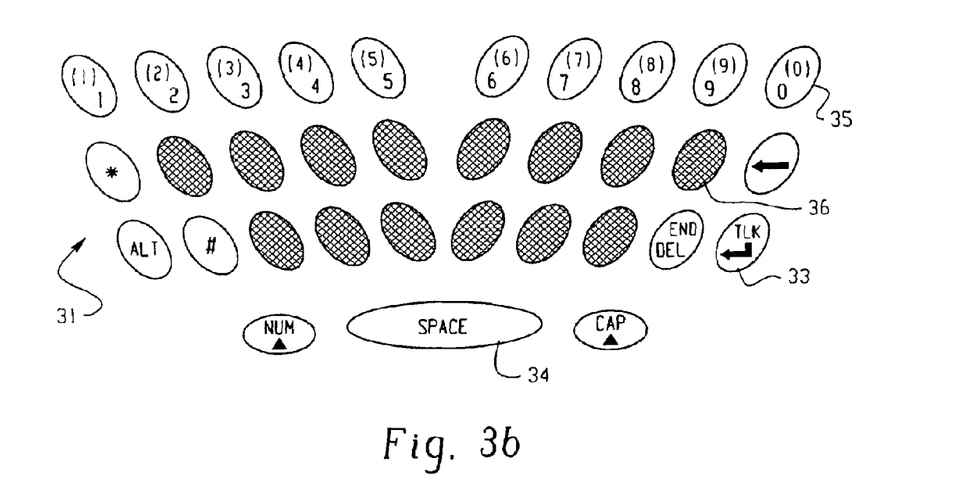

FIGS. 3a and 3b illustrate an additional exemplary multifunctional keyboard 30, 31 for a communication device in which a plurality of character entry keys can function as either letter entry keys 32 or number entry keys 35. Similar to the multifunctional keyboards 10, 20 described above with reference to FIGS. 1 and 2, this multifunctional keyboard 30, 31 may operate in telephony mode, data mode, and possibly joint mode. In addition, however, this multifunctional keyboard 30, 31 utilizes less keys by providing a letter entry mode, shown in FIG. 3a, and a number entry mode, shown in FIG. 3b. While in letter entry mode, the keyboard 30 preferably comprises a QWERTY style keyboard 30, although other keyboard styles may be utilized, having a plurality of letter entry keys 32, specialized keys 33 and a space bar 34. If a letter entry key 32 is pressed while the keyboard 30 is in letter entry mode, a telephony tone signal and/or a character code corresponding to the letter on the key may be generated, depending upon the operational mode (telephony, data or joint) of the keyboard 30. When the keyboard 31 is in number entry mode, however, a number of the keys are remapped to provide a numerical keypad, preferably comprising a plurality of number entry keys 35, specialized keys 33, a space bar 34 and a plurality of non-functional keys 36. If a number entry key 35 is pressed while the keyboard 31 is in number entry mode, a telephone tone signal and/or a character code corresponding to the number on (or represented by) the key may be generated, depending upon the operational mode of the keyboard 31 (telephony, data or joint).

Preferably, the character entry keys that function as both number entry and letter entry keys, depending upon the entry mode, have both a number and a letter printed on the key. For example, the "Q" key shown in FIG. 3a and the corresponding "1" key shown in FIG. 3b would preferably have both a "Q" and a "1" printed on the key. The numbers shown in parentheses represent the telephony tone signals corresponding to the letter or number character, and would preferably not be printed on the key. It should be understood, however, that other printing arrangements are contemplated. In addition, the keyboard 30, 31, or the communication device utilizing the keyboard 30, 31, preferably includes some means to indicate whether the keyboard is in number or letter entry mode. For example, when the keyboard 30, 31 is in one of the letter or number entry modes, an icon may appear on a display, a particular audible tone may sound when a key is pressed, an LED may light, or some other indication means may be activated.

In an alternative embodiment, the multifunctional keyboard 30, 31 may be provided in conjunction with a displayed software user interface. For instance, the multifunctional keyboard 30, 31 may by represented on a display, such as a liquid crystal display ("LCD"). In this embodiment, touching the LCD within the boundaries of a drawn key representation is equivalent to pressing a key on the keyboard 30, 31. In addition, an LCD embodiment of the multifunctional keyboard 30, 31 may include a function in which the symbols displayed on each drawn key change with the operational mode to emphasize the particular telephony signal and/or character code to be generated by each key.

Figure 4:
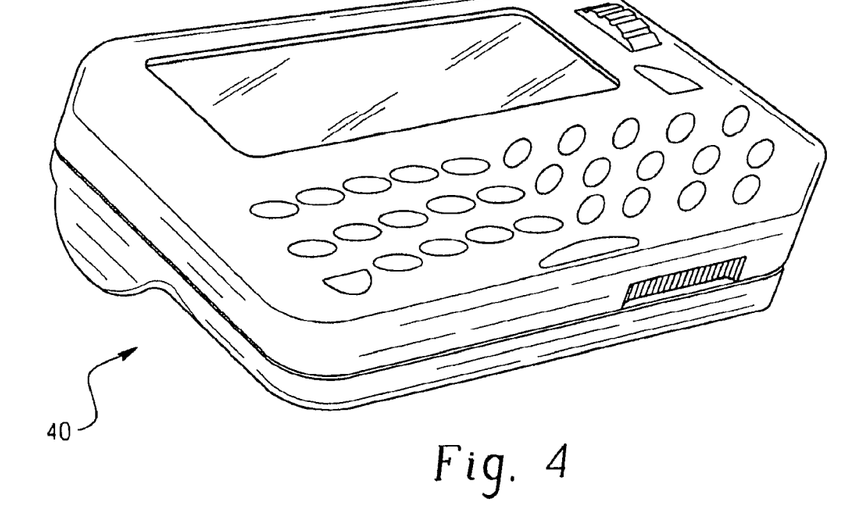
FIG. 4 is a top perspective view of a mobile communication device utilizing a multifunctional keyboard.

FIG. 4 is a top perspective view of a mobile communication device 40 utilizing a multifunctional keyboard 30. The keys of the multifunctional keyboard 30 are preferably uniformly distributed across the device 40 such that approximately half of the QWERTY keys are positioned on the left hand side of the device 40, and the remaining half of the QWERTY keys are positioned on the right hand side of the device 40. In addition, the QWERTY keys are preferably tilted at angles to facilitate easy thumb typing while the mobile device is held between the hands of a mobile device user.

Figure 5:
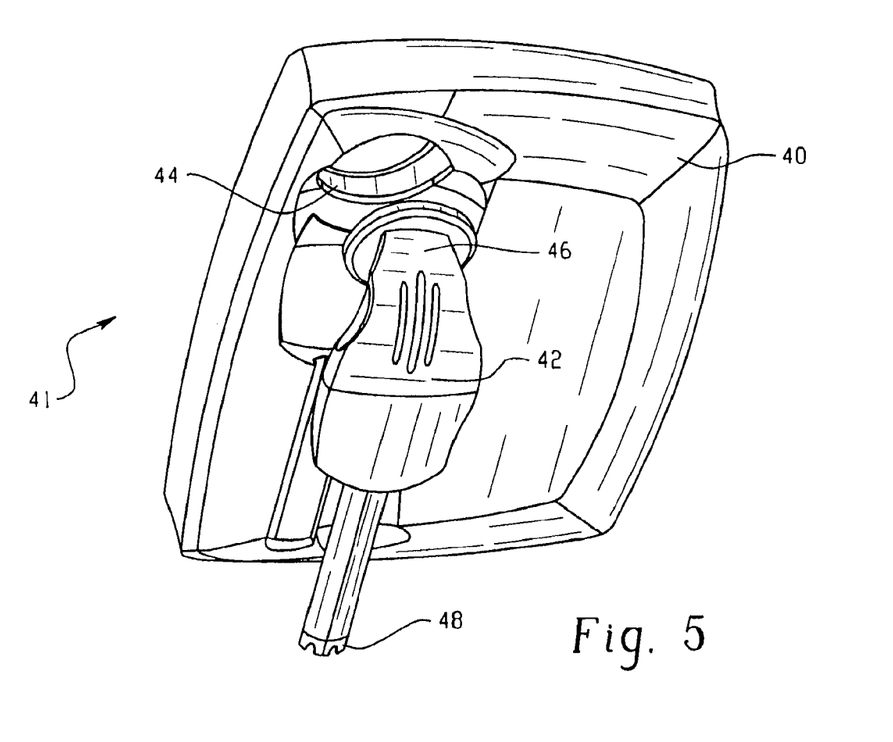
FIG. 5 is a bottom perspective view of the mobile communication device shown in FIG. 4.

FIG. 5 is a bottom perspective view 41 of the mobile communication device 40 shown in FIG. 4. The communication device 40 preferably includes an ear bud 42 that is detachably fitted within a cavity 44 in the device housing. The ear bud 42 preferably includes a speaker portion 46 proportioned to fit within the ear of a communication device user and a microphone portion 48 that extends towards the user's mouth. When fitted into the device user's ear, the ear bud 42 may, for example, be used to establish voice communication through the mobile communication device 40. It should be understood, however, that the mobile communication device 40 is not limited to embodiments having a detachable ear bud 42. In other embodiments, such as the embodiment described below with reference to FIGS. 5a and 5b, voice communication may be enabled with other means, such as a speaker and microphone fixedly mounted on the device or an ear piece and microphone connected to the device 40 through an electrical terminal or jack.

Figure 5A:
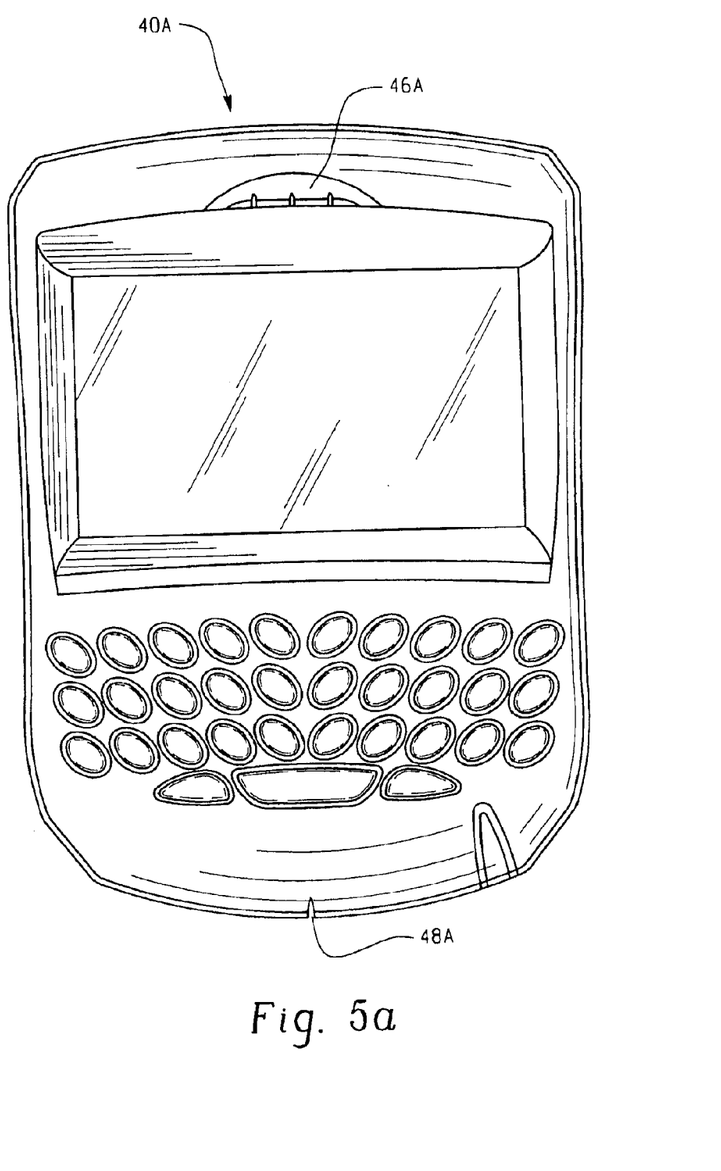
FIG. 5a is a top view of an additional mobile communication device utilizing a multifunctional keyboard.

FIG. 5a is a top view of an additional mobile communication device 40A utilizing a multifunctional keyboard 30. The communication device 40A preferably includes a speaker 46A and a microphone 48A fixedly mounted on the device. When positioned near the device user's head, the speaker 46A and the microphone 48A may, for example, be used to establish a voice communication though the communication device 40A.

Figure 5B:
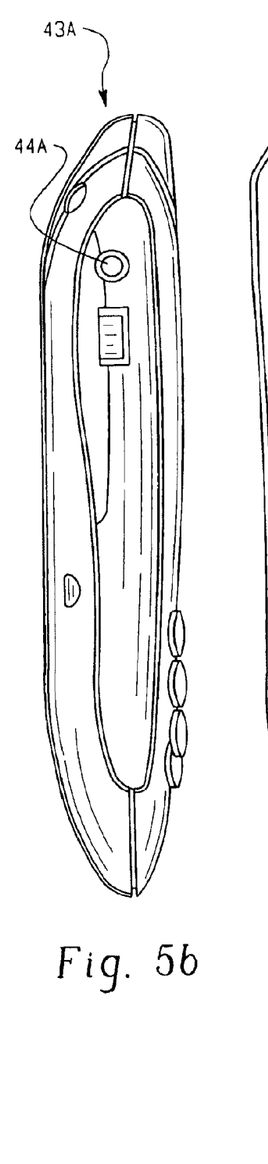

FIG. 5b is a side view 42A of the additional mobile communication device 40A shown in FIG. 5a. The communication device 40A preferably includes a jack 44A for connecting a headset having an earpiece and microphone to the device 40.

Figure 6:
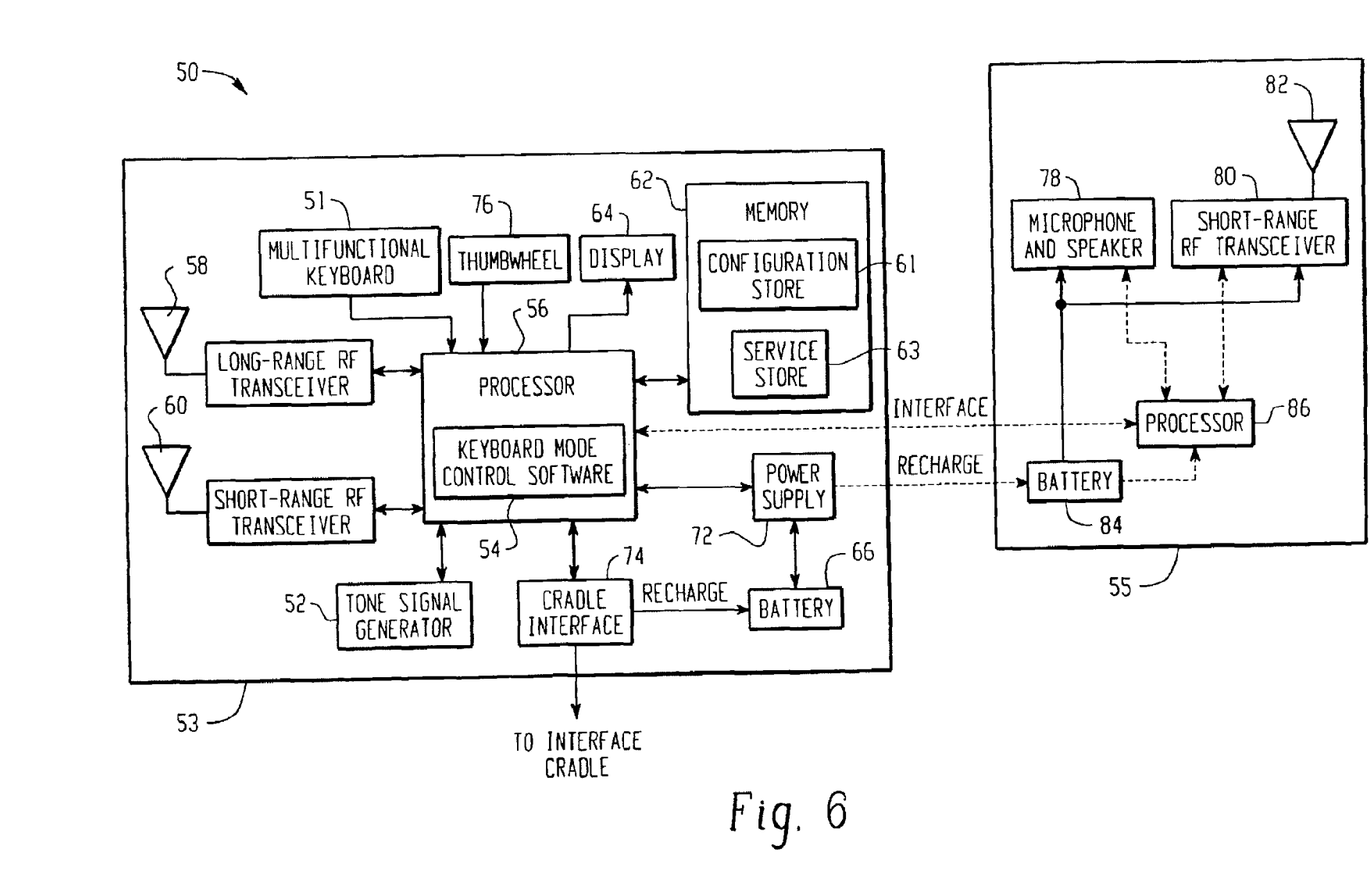
FIG. 6 is a block diagram of an exemplary mobile communication device utilizing a multifunctional keyboard.

FIG. 6 is a block diagram of an exemplary mobile communication device 50 utilizing a multifunctional keyboard 51. The device 50 preferably includes a main module 53 and an ear bud module 55. The multifunctional keyboard 51 is included in the main module 53 along with a tone signal generation circuit 52, a keyboard mode control software module 54 operating on a processor 56, and a memory device 62 having a configuration store 61 and a service store 63. In an alternative embodiment, however, the processor 56 may be replaced by an alternative processing unit, such as a field programmable gate array ("FPGA") or a software interpreter module.

The processor 56 receives keyboard output signals from the multifunctional keyboard 51 and converts these output signals into telephony tone signals, character codes or both. The mode of operation (data, telephony or joint) for the multifunctional keyboard 51 is preferably determined by the keyboard mode control software module 54 based on either the current requirements of the device 50, a selection by the user of the device 50, or possibly based on some other triggering event. The keyboard mode control software 54 may, for example, set the device 50 to a particular keyboard mode when a software application is executed on the device 50 and possibly when a particular operation is executed by the software application. For instance, if an address book application is executed, the keyboard mode control software 54 will preferably automatically set the multifunctional keyboard 51 to a preferred mode. When entering or editing an address book entry, data mode is the preferred mode for editing or entering a name, email address, or street address field, whereas joint mode is the preferred mode for editing or entering a telephone number field. Conversely, when retrieving an address book entry, data mode is the preferred mode for retrieving a name, email address, or street address, whereas either telephony mode, joint mode or data mode may be the preferred mode for retrieving a telephone number depending upon the purpose for which it is being retrieved. For instance, if a telephone number is retrieved from an address book in order to initiate a voice communication, the number will preferably be retrieved in telephony or joint mode.

The configuration store 61 and the service store 63 located in the memory device 62 are preferably used by the keyboard mode control software 54 to determine which operational mode (data, telephony or joint) is required for a particular application. In a preferred embodiment, however, the operational mode of the keyboard 51 may also be selected or overridden by a user of the mobile device 50. For instance, with reference to FIG. 2, a mobile device user may preferably select or trigger a change in the keyboard mode by pressing one of the mode keys 29.

Similarly, the letter entry or number entry modes for the keyboard embodiment 30, 31 shown in FIG. 3, is preferably also controlled by the keyboard mode control software 54. Similar to the operational modes (data, telephony or joint), the number and letter entry modes may be automatically selected by the keyboard mode control software 54 based on the application currently executing on the device 50, may be selected by the device user, or may possibly be selected by some other triggering event. For instance, if a voice communication application is executed on the device 50, the keyboard mode control software 54 will preferably automatically set the keyboard 51 to number entry mode (and telephony or joint mode) so that a telephone number may be dialed. If the user then desires to enter the telephone number using letters, the user may preferably trigger the keyboard mode control software 54 to switch the keyboard 51 to letter entry mode. For example, with reference to FIGS. 3a and 3b, the user may be able to switch between letter and number entry modes by pressing the "NUM," "CAP," and/or "ALT" key, selecting a mode from a pull-down menu, pressing a specialized key, holding down a key for a predetermined period of time, or by some other means.

Referring again to FIG. 6, once an operational mode (and possibly one of the letter or number entry modes) for the multifunctional keyboard 51 has been selected, either automatically or by a user, the keyboard mode control software module 54 instructs the processor 56 to convert the keyboard output signals to telephony tone signals and/or character codes. If the communication device 50 is in data or joint mode, then the keyboard output signals are converted into character codes, such as ASCII codes. If the communication device 50 is in telephony or joint mode, then telephony tone signals, such as DTMF signals, are generated. Then, as the telephony tone signals and/or character codes are generated, they may be transferred to a buffer by the processor 56 to await further processing. For instance, if a telephone number is entered into the device 50 while the keyboard 51 is in joint mode, then the character codes and DTMF tone signals for the telephone number are preferably stored in a buffer until the user initiates the call, for example by pressing a "send" key. Once the call is initiated, the DTMF tones are further processed to execute the call, and the character codes may, for example, be further processed to log the call.

The tone signal generation circuitry 52 may be used by the processor 56 to generate the telephony tone signals while the multifunctional keyboard 51 is in telephony or joint mode. In an alternative embodiment, however, digital telephony tone signals may be generated directly by the processor 56, or by a digital signal processor. In addition to telephony tone signals, the tone signal generation circuitry 52 may also generate audible tones preferably at the option of the communication device user. The audible tones may be used, for example, to notify the user when a key is pressed on the multifunctional keyboard 51. In alternative embodiments, the tone signal generator may generate distinctive tones when a telephony tone signal or character code is generated.

In addition to the components and software relating to the multifunctional keyboard 51, the main module 53 also preferably includes a pair of antennas 58, 60 (although a single antenna structure could be used), a memory device 62, an LCD display 64, at least one rechargeable battery 66, a long-range RF transceiver 68, one or more short-range RF transceivers 70, a power supply and recharging circuit 72, a cradle interface circuit 74, and an auxiliary input device such as a thumbwheel 76. The main module 53 may also include a pressure-sensitive writing tablet. Operationally, the long-range RF transceiver 68 is used to send and receive information from a long-range wireless network, and the one or more short-range RF transceivers 60 are used to send and receive information from the ear bud module 55, and possibly from other local devices such as an RF interface cradle, or a local printer coupled to a LAN, or other types of printing or display devices.

The ear bud module 55 is preferably an RF-enabled earpiece that may be connected to (both mechanically and electrically) the main module 53 as described above. The ear bud module 55 preferably includes a microphone and a speaker 78, a short-range wireless transceiver 80, an antenna 82, a rechargeable battery 84, and possibly an integral processor 86. Operationally, the short-range wireless transceiver 80 is used to establish an RF link between the ear bud module 55 and the main module 53.

Figure 7:
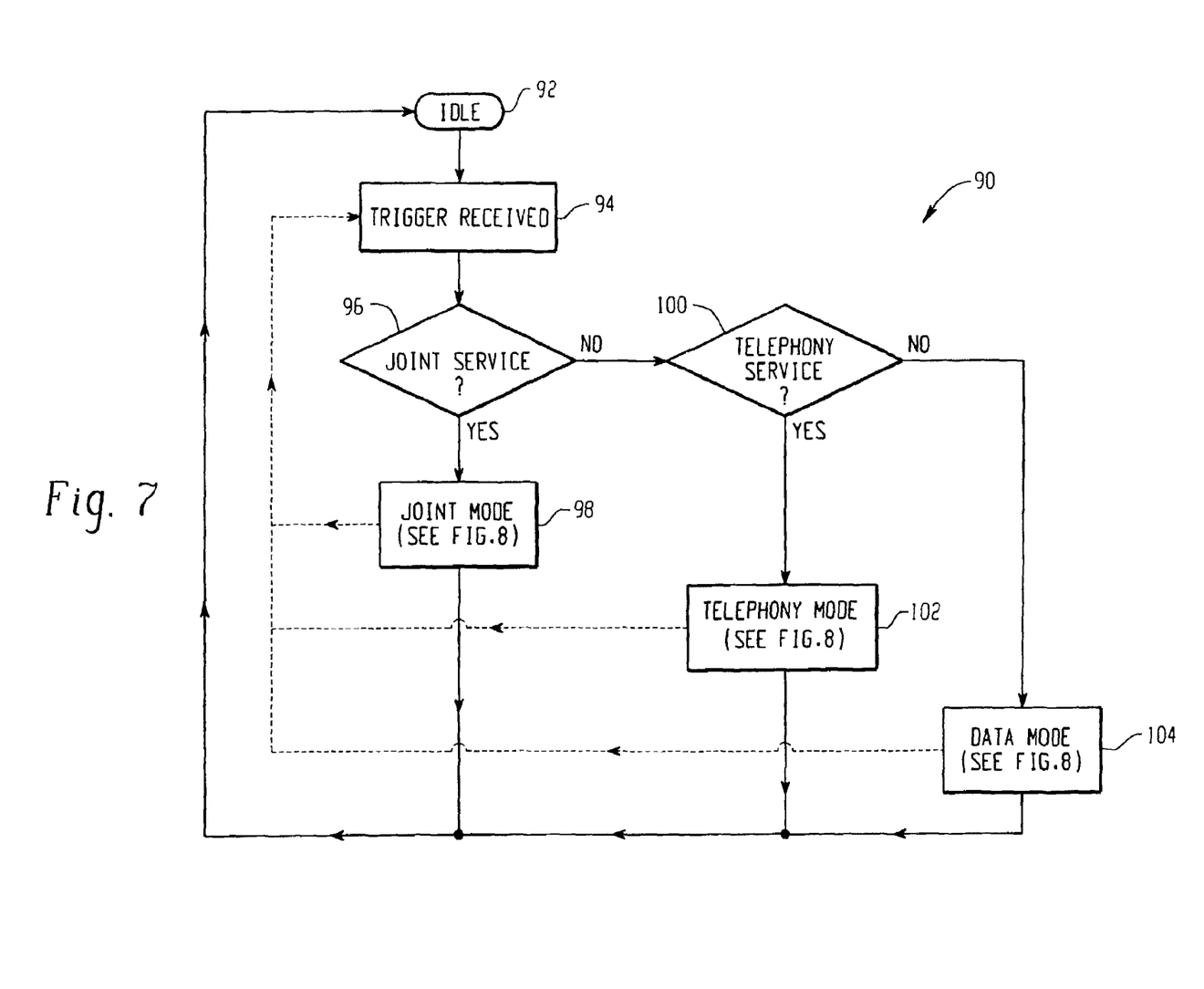
FIG. 7 is a flow diagram illustrating an exemplary method for controlling the operational mode of the multifunctional keyboard in a communication device.

FIG. 7 is a flow diagram illustrating an exemplary method 90 for controlling the operational mode of the multifunctional keyboard 51 in a communication device 50. This exemplary method 90 may, for example, be executed by the software mode control software module 54 described above. In step 92, the communication device 50 is idle. The device 50 preferably remains idle until the processor 56 receives a trigger in step 94. The trigger may, for example, be initiated by an unprocessed key stroke, the activation of a switch, an incoming message, an alarm condition, the activation of a software application, or any other type of event that may be detected by the device 50. For instance, the multifunctional keyboard 51 may include a specialized key that triggers a keyboard mode change, or a mode change may be automatically triggered by the detection of some event such as the activation of a software application or a selection by the user of the device.

Once a mode change has been triggered in step 94, the type of service (data, telephony or joint) required by the device 50 is determined in steps 96 and 100. The required service may be determined, for example, by accessing the service store 63 locally maintained in a memory location 62 on the device 50. The service store 63 preferably includes a log indicating the type of service required by each software application on the device 50 and also preferably includes a default service. For the purposes of the illustration shown in FIG. 7, the default service is the data mode. It should be understood, however, that either the telephony mode or the joint mode could also be the default service for the mobile device 50. In a preferred embodiment, the system also accesses the configuration store 61 maintained in the memory location 62 to determine if a preferred mode has been selected for a particular application or triggering event. The configuration store 61 preferably includes user configurable preferences relating to the modes of operations. For instance, the configuration store 61 may indicate that the joint mode is preferred when the communication device 50 connects to a particular telephone number or IP address.

In step 96, the system determines whether the software application currently operating on the device (or other triggering event) requires the multifunctional keyboard 51 to operate in joint mode. If so, then the multifunctional keyboard 51 is set to joint mode in step 98. Otherwise, the device 50 determines whether telephony mode is required in step 100. If the current software application (or other triggering event) requires telephony mode, then the keyboard 51 is set to telephony mode in step 102. If neither joint mode nor telephony mode are required, however, then the multifunctional keyboard 51 is set to data mode, its default mode of operation, in step 104. The modes of operation are detailed below with reference to FIG. 8.

While the multifunctional keyboard 51 is in a particular operational mode, an asynchronous mode change may preferably be initiated upon the receipt of an additional trigger. This type of mode change is asynchronous in the sense that the change may preferably be initiated at any point during the operational modes described below with reference to FIG. 8. Asynchronous mode changes are illustrated in FIG. 7 by the dotted lines from the three operational modes (steps 98, 102 and 104) returning to step 94 at which a trigger is received. If no asynchronous mode change is received, however, the keyboard 51 preferably remains in the same operational mode until the currently executing software application completes its operations, at which point the system returns to an idle state at step 92.

In a preferred embodiment, more than one application may be running on the device 50 at the same time, possibly requiring concurrent operation of more than one keyboard mode. For instance, if several applications are executing on the device 51, one application may be in the foreground (the active application) while the other applications are in the background (the idle applications). In this instance, the multifunctional keyboard 51 will preferably operate in the mode associated with the foreground application. Then, as the device user (or the device itself) switches from the foreground application to an idle application, an asynchronous trigger is preferably generated to change keyboard modes. Preferably, before the device 50 switches from one application and associated keyboard mode to another, the current mode associated with the foreground application is stored in the service store 63. Then, when the idle application returns to the foreground and becomes active, the stored keyboard mode associated with the application is detected from the service store 63.

Figure 8:
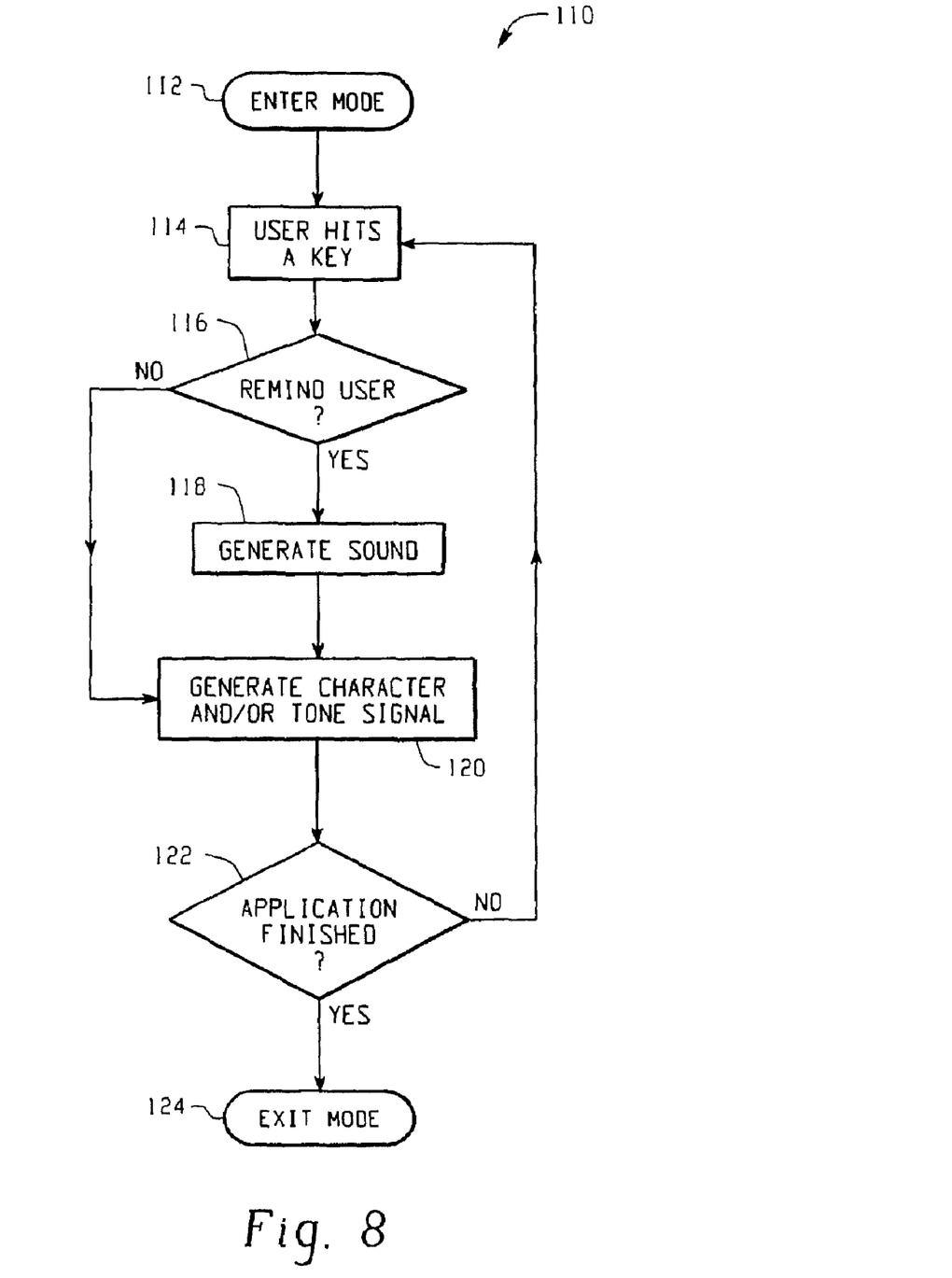
FIG. 8 is a flow diagram illustrating the modes of operation for the multifunctional keyboard.

FIG. 8 is a flow diagram illustrating the exemplary modes of operation 110 for the multifunctional keyboard 51. In step 112, the device 50 enters a keyboard mode, such as the joint mode, telephony mode or data mode. Then, when a device user presses a key on the multifunctional keyboard 51 (step 114), the system 50 preferably determines whether a user notification function has been enabled in step 116. The user notification function may preferably be configured by the device user to generate an audible tone as a key is pressed. To determine the user notification configuration, the system 50 preferably detects one or more notification flags set by the user and stored in the configuration store 61. Preferably, notification flags may be stored in the configuration store 61 to either enable or disable the notification function for the data, telephony and joint modes. If the notification function has been enabled for the current keyboard mode, then the device 50 generates an audible tone in step 118. In a preferred embodiment, the audible tone generated in step 118 is different for each keyboard mode, thus enabling the device user to determine the current mode.

In step 120, the device 50 generates a character code and/or telephony tone signal corresponding to the key pressed by the user and a corresponding keyboard output signal from the multifunctional keyboard 51. As described above, the signal generated in step 120 depends upon the operational mode of the multifunctional keyboard 51. If the multifunctional keyboard 51 is in joint mode, then the system 50 generates both a character code and a telephony tone signal in step 120. If the multifunctional keyboard 51 is in telephony mode, then the system 50 generates a telephony tone signal. If the multifunctional keyboard 51 is in data mode, then a character code is generated. Once the appropriate character and/or telephony tone signal has been generated in step 120, the system 50 determines whether the current application or other triggering event requiring the current keyboard mode is complete in step 122. If the application is complete, then the system exits its current keyboard mode in step 124 and returns to an idle state. Otherwise, the system 50 remains in the current mode and awaits another keystroke at step 114. As was described above with reference to FIG. 7, however, asynchronous mode changed may occur from within any step of FIG. 8.

In addition to the embodiments described above with reference to FIGS. 1-8, additional embodiments are contemplated which allow the operations of the multifunctional keyboard to be carried out on a lower system level without need for an actual keyboard or a telephony tone signal generator. For example, a communication device may include a translation mode wherein the mode control software translates key codes to telephony signals, and the key codes are provided by voice recognition software recognizing keys spoken by a user, or, alternatively, the key codes being provided from storage. In such an embodiment, the mode control software preferably translates input character codes to generate telephony signals and/or output character codes, the input character codes being interpreted as if they were generated by use of a multifunctional keyboard, thus enabling the communication device to be easily adapted to a variety of sources of input characters of which a keyboard is but one example.

This written description uses examples to disclose the invention, including the best mode, and also to enable any person skilled in the art to make and use the invention. The patentable scope of the invention is defined by the claims, and may include other examples that occur to those skilled in the art.

We claim:

1. A communication device, comprising:
   twenty-six keys that are each labeled with a different letter of the alphabet and are each assigned a number;
   the device being configured in a joint mode, for each key pressed by a user, to simultaneously generate both a telephony tone signal corresponding to the number assigned to the pressed key and a character code corresponding to the letter assigned to the pressed key,
   wherein the numbers 2-9 are assigned respectively to keys A-C, D-F, G-I, J-L, M-O, P-S, T-V, and W-Z.

2. The device of claim 1, wherein the keys are arranged in a QWERTY configuration.

3. The device of claim 1, wherein the device is further configured to output, for each key pressed by a user, a character code signal corresponding to the pressed key.

4. A communication device comprising:
   twenty-six keys that are each labeled with a different letter of the alphabet and are each assigned a number;
   the device being configured in a joint mode to simultaneously generate both a telephony tone signal corresponding to the number assigned to each key pressed by a user and a character code signal corresponding to the letter assigned to each key pressed by a user,
   wherein the numbers 2-9 are assigned respectively to keys A-C, D-F, G-I, J-L, M-O, P-S, T-V, and W-Z.

5. The device of claim 4, wherein the keys are arranged in a QWERTY configuration.

6. The device of claim 4, wherein the numbers are communicated through telephony tone signals.

7. The device of claim 4, wherein the numbers are communicated through a display of the device.

8. The device of claim 4, wherein the device has a first mode of operation in which the device communicates the numbers assigned to the pressed keys and a second mode of operation in which the device communicates the letters labeled on the pressed keys.

9. The device of claim 8, further comprising a mode key in which the user can switch from the first mode to the second mode.

10. The device of claim 8, wherein the device is configured to indicate the mode of operation.

11. A method of operating a multifunctional keyboard for a communication device, comprising the steps of:
    providing twenty-six keys that are each labeled with a different letter of the alphabet and are each assigned a number; and
    in a joint mode simultaneously generating both a telephony tone signal corresponding to the number assigned to each key pressed by a user and a character code signal corresponding to the letter assigned to each key pressed by the user,
    wherein the numbers 2-9 are assigned respectively to keys A-C, D-F, G-I, J-L, M-O, P-S, T-V, and W-Z.

12. The method of claim 11, wherein the numbers are communicated through telephony tone signals.

13. The method of claim 11, wherein the numbers are communicated through a display of the device.

* * * * *